No. 699,851. Patented May 13, 1902.
C. W. ROEPPER & G. P. SCHOLL.
APPARATUS FOR FUSED BATH ELECTROLYSIS.
(Application filed Aug. 29, 1898. Renewed Oct. 15, 1901.)

(No Model.) 5 Sheets—Sheet 1.

WITNESSES: INVENTORS

No. 699,851. Patented May 13, 1902.
C. W. ROEPPER & G. P. SCHOLL.
APPARATUS FOR FUSED BATH ELECTROLYSIS.
(Application filed Aug. 29, 1898. Renewed Oct. 15, 1901.)

(No Model.) 5 Sheets—Sheet 3.

WITNESSES: INVENTORS

No. 699,851. Patented May 13, 1902.
C. W. ROEPPER & G. P. SCHOLL.
APPARATUS FOR FUSED BATH ELECTROLYSIS.
(Application filed Aug. 29, 1898. Renewed Oct. 15, 1901.)

(No Model.) 5 Sheets—Sheet 4.

WITNESSES: INVENTORS

No. 699,851. Patented May 13, 1902.
C. W. ROEPPER & G. P. SCHOLL.
APPARATUS FOR FUSED BATH ELECTROLYSIS.
(Application filed Aug. 29, 1898. Renewed Oct. 15, 1901.)

(No Model.) 5 Sheets—Sheet 5.

UNITED STATES PATENT OFFICE.

CHARLES W. ROEPPER AND GEORGE P. SCHOLL, OF PHILADELPHIA, PENNSYLVANIA; SAID SCHOLL ASSIGNOR TO SAID ROEPPER.

APPARATUS FOR FUSED-BATH ELECTROLYSIS.

SPECIFICATION forming part of Letters Patent No. 699,851, dated May 13, 1902.

Application filed August 29, 1898. Renewed October 15, 1901. Serial No. 78,693. (No model.)

*To all whom it may concern:*

Be it known that we, CHARLES W. ROEPPER, a citizen of the United States, and GEORGE P. SCHOLL, a subject of the Emperor of Germany, residing at Philadelphia, in the State of Pennsylvania, have invented a certain new and useful Apparatus for Fused-Bath Electrolysis, of which the following is a specification.

Our invention relates to an apparatus whereby the electrolysis of fused substances may be economically conducted upon a large scale for the purpose of producing commercially the products of such electrolysis. We are aware of a number of varieties of apparatus which have been used and some of which have been patented for the purpose of conducting the electrolysis of a bath the contents of which require to be heated to a state of fusion. All of these apparatus have developed defects when subjected to the severe tests of use on a commercial scale. Under such use they have proved inadequate to withstand long-continued heat and the rough handling of workmen. In some cases shaped clay vessels have been used. These are fragile and incapable of undergoing the extremes of temperature to which they must frequently be subjected. Furthermore, it is difficult to obtain such vessels of sufficient size and strength. The use of such apparatus although attaining some success in the laboratory has failed to solve satisfactorily the problem of the commercial manufacture of the products of fused-bath electrolysis.

Our invention has overcome the defects presented by previous apparatus and results in the possibility of bringing the substances to and maintaining them in a fused state with a minimum expenditure of heat, assuring at the same time the continuity of the electrolytic operation by reason of the simplicity of construction of the apparatus and the ease with which its component parts can be repaired or exchanged.

Among the important features embodied in our invention may be mentioned the partial, but only partial, separation of the chamber where the heating of the salts or other substances takes place from the chamber where the electrolysis is conducted. By partial separation we mean here and throughout this specification a separation which while it does not in any way interfere with the uninterrupted interflow of the materials between the heating and electrolytic chambers, yet so far isolates the electrolytic chamber as to permit access to and manipulation of the electrolytic apparatus without interfering with the continuity of the heating process and without interference with the operator by reason of the products of combustion; but while thus separating the electrolytic chamber from the heating-chamber for the purposes just explained we avoid the opposite extreme of having two wholly distinct vessels for these two purposes with a mere pipe or similar connection. Such an arrangement is both uneconomical and impractical—uneconomical because of the loss of heat which takes place by reason of the circulation of air between the two vessels and impractical because in many instances a narrow connection between two such vessels is liable to freeze up.

Another important feature is the ready removability of the electrolytic apparatus for purposes of renewal or repair without interruption of the continuity of the fusion process.

Another such feature is the selection for contact with the fused bath of such durable and resistant material as to be capable of standing the destructive action of the fused substances and other products. These resistant qualities are further supplemented by (a) a system of jacketing used in connection with a cooling medium whereby a thin incrustation of the parts subject to the destructive action of the fused bath may be obtained with a consequent preservative action and (b) the selection of such shapes and sizes for parts liable to destruction as to make them readily replaceable.

Another important feature of our apparatus which we desire to emphasize at the outset is that it admits of ready and economical reduplication—that is to say, it lends itself to varying constructions in which a greater or less number of separate electrolytic compartments may be grouped around and operated in conjunction with a single large heating and fusion chamber. In this way the utmost economy of fusion is combined with the largest output of electrolytic production.

In the accompanying drawings we have shown and we will now proceed to describe a number of apparatus in which we have embodied in differing constructions the principles which underlie our invention. It must be understood, however, that a large variety in the details of construction is possible and that the specific constructions which we have described are only typical. In some cases possible variations not shown will be adverted to; but in other respects the possible variations are so numerous as to make it impossible to refer to them all.

In the accompanying drawings, Figures 1, 2, 3, 4, 5, 6, 7, and 8 illustrate both in its entirety and in some details a form of apparatus constructed in accordance with our invention. This particular apparatus is a simple embodiment of it, and it will therefore be first described.

$a\ a\ a$ are the walls and top of the furnace. These may be built of fire-brick or other refractory material.

A is the firing-door, B the grate, and C the fusion vessel.

D is the chimney by which the products of combustion are carried off. The base E of this chimney forms a convenient mixing and preheating compartment, access thereto being had at the door $e$. It is within the effective reach of the supply of heat, and by reason of its higher level its contents when fused flow down into the fusion vessel. This preheating-compartment may be otherwise located to suit convenience.

The fusion vessel C is considerably wider than the furnace and projects through its side under the arch $c$. Along the line of this arch a partition F divides the fusion vessel into two parts. This partition, although dipping well below the normal level of the contents of the fusion vessel, does not reach the bottom of the vessel. It runs the whole length of the vessel, dividing it into two parts, which we will call the "heating-chamber"— $i.\ e.$, the part which is within the furnace— and the electrolytic chamber, which is the part which projects out of the furnace and where the electrolysis occurs. These chambers are alongside of each other and are designated in Fig. 1, respectively, $f$ and $f'$. Within the electrolytic chamber $f'$ there fits a removable electrolytic box G. (Illustrated separately in Fig. 2.) It is preferably made of cast-iron or steel and is open at the bottom, resting on two or more of its sides upon ledges in the electrolytic chamber, which sustain it at the proper height therein. The space above the electrolytic chamber $f'$ may be inclosed by thinner walls $d\ d$, and the space between the top of the partition F and the arch $c$ may be closed by a clay plate $d'$. These parts, however, are readily removable.

It is essential that all the parts which come in contact with the fused bath shall be made either of a highly-indestructible material or else otherwise protected from the destructive action of the melted bath. Certain parts, indeed—as, for instance, the walls of the electrode-compartments about to be described— are so arranged that if destroyed they may readily be replaced. To these the limitation which has just been mentioned does not so strongly apply. In order to prevent the destruction of the other parts which are subjected to the action of the heated bath, these parts are in the apparatus which is now being described surrounded by a cooling-space. Thus it will be noticed that the bottom and sides of the fusion vessel are surrounded with cooling-spaces $g\ g\ g$ near their inner surface. Inlet and outlet pipes $g'\ g^2$ communicate with these cooling-spaces and admit of a proper circulation of a cooling medium therein. Likewise the partition F is hollow and provided with a cooling-space. The electrolytic box G is similarly constructed. The result of this cooling-jacket is that by a proper circulation of cooling mediums through the cooling-spaces the temperature of the sides of the fusion vessel and other parts which require protection may be kept slightly below the fusion-point. Of course the difference in temperature must not be too great. It must be maintained, however, at such a temperature as to cause a constant slight incrustation on the sides and bottom of the bath. Under these circumstances the sides and bottom of the fusion vessel and of the partition and of the electrolytic box may be made of metal or other substances which were they exposed continuously to the direct action of the molten bath would be destroyed, but being protected by a thin layer of incrustation are thus preserved.

Figure 1:
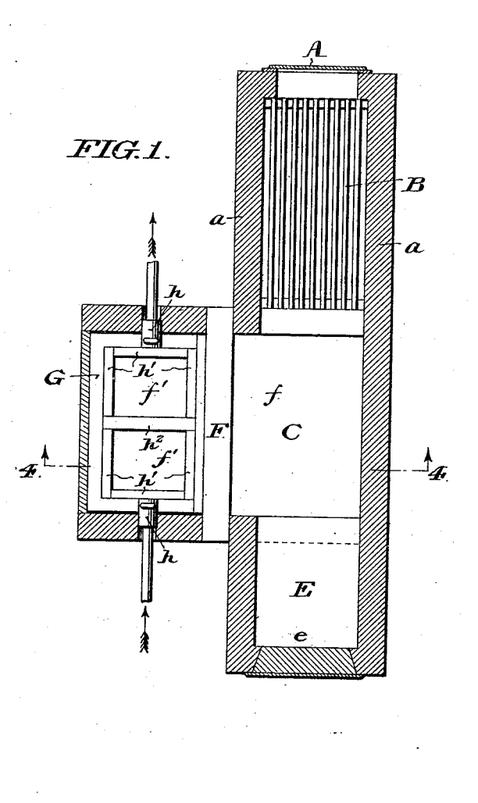
Fig. 1 is a horizontal section along the line 1 1, Fig. 4.
Figure 2:
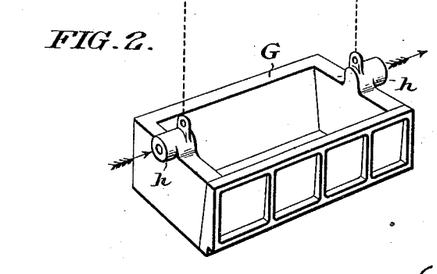
Fig. 2 is an illustration of the removable electrolytic box.
Figure 6:
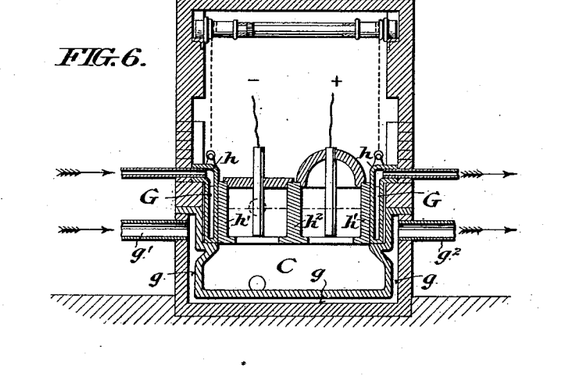
Fig. 6 is a similar section along the line 6 6, Fig. 4.

The removable electrolytic box G is shown in Fig. 2. It is of such shape as to fit loosely within the electrolytic chamber—that is, the part of the fusion vessel which is outside of the partition F. Within, the box is lined with fire-brick or other suitable material and divided into electrode-compartments. Two such parts only are shown; but the number is immaterial, corresponding to the convenience of the operation. To facilitate this construction, the inner walls of the electrolytic box are preferably made to taper slightly downward, so that the fitting of the fire-brick lining within it is easy, as well as its renewal, if necessary. To facilitate its removal, the electrolytic box is furnished with two trunnions $h$ $h$ or other suitable supports. Through these trunnions, as shown in Fig. 2, the inlet and outlet of the cooling medium is conducted. To them also are attached the supports by which the electrolytic box is at will raised and removed from the apparatus for purposes of repair or substitution. This method of removal, as shown, consists of a trolley running on a suitable track, by which the box may be lifted and run out. The method of elevation and removal is, however, immaterial. Any other convenient method may be employed. A desirable method of forming these electrode-compartments is shown in Fig. 1 and Fig. 6, where the sides and ends of the electrolytic box are shown fitted with flat plates $h'$ $h'$ $h'$, of fire-clay or other suitable material, and similarly divided by a partition $h^2$, the plates being simply blocked in position, an arrangement which is facilitated by the sloping sides of the electrolytic box. In this way the replacement of any part of the sides or partition which may be destroyed is very simply effected. Alternatively the entire lining of the box, including the partitions, may be formed from a single mold of fire-clay or other suitable material.

Figure 4:
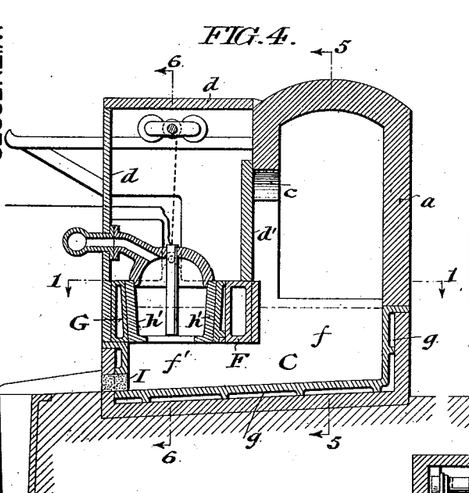
Fig. 4 is a vertical cross-section along the line 4 4, Fig. 1.
Figure 5:
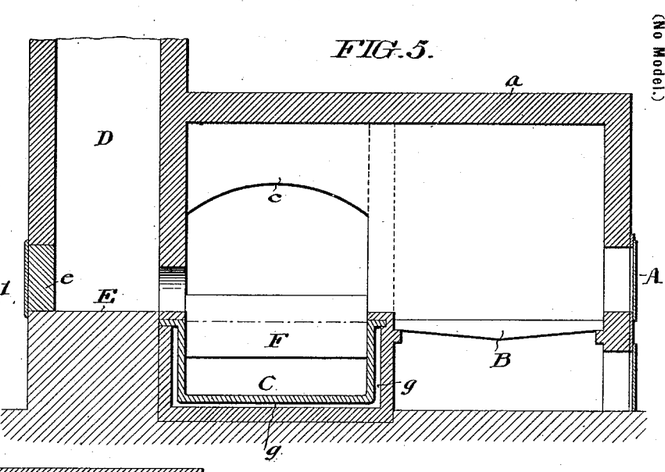
Fig. 5 is a vertical longitudinal section along the line 5 5, Fig. 4.
Figure 7:
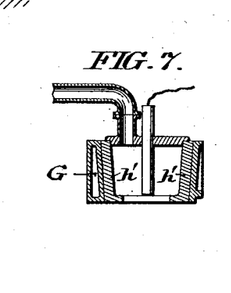
Fig. 7 is a section of an electrode-compartment corresponding to that seen in Fig. 4, but varying from it in detail.

It is desirable that the lower inner edges of the lining shall have the inwardly-projecting ledges seen in Figs. 4, 6, and 7. On these ledges hollow electrodes or plates may be rested, thereby forming a lining which can act as electrodes.

Figure 18:
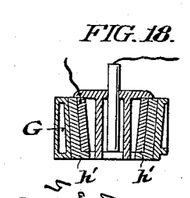
Fig. 18 is a similar section in which the electrodes are shown arranged one within the other.

The electrode-compartments of the removable electrolytic box as figured in the drawings have been shown alongside of each other; but it is to be understood that the arrangement of these compartments may be varied to suit the convenience of the operation, and they may be arranged one within the other, as is particularly shown in Fig. 18.

The details for the coverings for the electrode-compartments and of the electrodes within them must vary according to the electrolytic product which is to be obtained therein, depending consequently upon the composition of the fused bath. In the apparatus now under consideration several alternative forms are exhibited. Thus in Fig. 4 the electrode-box which is seen has a dome-shaped cap fitting tightly upon it, with a suitable egress-pipe. A single rod electrode projects down through the dome into the compartment. This is a convenient method of collecting a gaseous element resulting from the electrolysis. Thus in the electrolysis of chlorin salts chlorin gas is given off at the anode and may be thus collected, care being taken to form the cap and also all connections of a material which will resist the action of the chlorin gas.

For a liquid element which will float upon the fused bath the electrolytic chamber may be arranged as shown to the left in Fig. 6, where a flat top holds a dependent electrode. A suitable aperture pierces the side of the electrolytic box at a proper height to draw off the liquid which may be formed.

Figure 8:
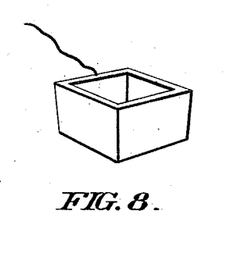
Fig. 8 illustrates an electrode in the form of a hollow square, which may be substituted for the rod-shaped electrodes shown in Figs. 4, 6, and 7.

In Fig. 8 an electrode in the form of a hollow square is shown. It may be fitted within the electrode-compartment. In all of these forms it will be understood that the description is wholly typical and explanatory and not a matter of limitation.

Fig. 7 shows a construction having a similar purpose to that shown in Fig. 4, differing in the flatness of its top and the arrangement of the connections.

Figure 3:
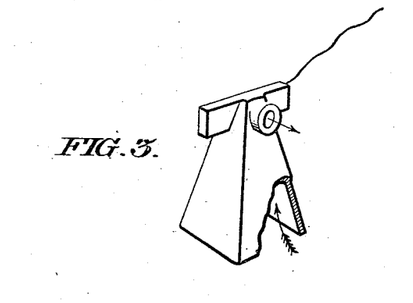
Fig. 3 is a form of electrode suitable for the collection of a liquid metallic element resulting from the electrolysis.

Fig. 3 shows a bell-shaped electrode which may be used. It may be formed of iron or any other proper material and will rest upon the projecting ledges at the bottom of the electrode-compartment. By reason of its tapering shape a liquid formed by the electrolysis and floating on the electrolyte is concentrated toward the top, filling it, and may be drawn off through the exit seen at the top.

The operation of the apparatus thus far described is as follows: The heated products of combustion passing from the grate through the heating-chamber acting upon the principle of a reverberatory furnace keep the contents of the fusion vessel molten. In many instances gas or oil are more convenient to use than solid fuel. In some places also the grate for solid fuel may be supplemented by these other means. The fused bath maintaining its own level rises to equal height in the electrolytic and fusion chamber, the partition F completely sealing the one from the other and preventing the escape of any of the products of combustion. In the electrolytic chamber the electrolytic box is lowered to a proper depth into the fused bath, its open bottom allowing the bath to come under the influence of the electrodes, none of the products escaping into the fusion-chamber. At any point during the operation and without materially interfering with it the electrolytic box and its contents may be removed for purposes of repair or otherwise and a new box rapidly substituted. This may be done without lowering the level of the electrolyte, and consequently without interfering with the fusion-chamber in any way. If desired, however, at any time the fused contents may be withdrawn through a tap-hole (shown at I, Fig. 4) and run off into any suitable receptacle. Before filling the fusion vessel the electrolytic box may be raised, so that the heat can play over the entire surface and under and into the electrolytic box for preparatory heating. The fusion vessel may then be gradually filled until its contents have immersed the partition-wall.

We desire to here point out the economic advantage of having the heating-chamber and the electrolytic chamber in such close proximity and such open connection with each other. In this way there is little or no loss of heat between the two, and it will be noticed that there is no uncontrolled air-space between the two, in which respect our apparatus differs in principle from all previous apparatus in which a separate heating vessel has been connected by a pipe or similar connection with a separate electrolytic vessel. We desire to point out that we use the word "chamber" in this application as denoting a subdivision of a common fusion vessel and in order to distinguish it from those apparatus in which the heating and the electrolysis take place in separate although connected vessels.

When it is desirable to preheat or melt materials before adding them to the main bath, it can be done on the preheating-chamber E.

With certain substances it is important to protect the fused bath from the products of combustion to prevent action between them. This we accomplish, among other ways, by a layer of carbon, sand, or melted slag lying upon the top of the contents of the fusion vessel within the heating-chamber and sufficiently thin to allow ready radiation of the heat therethrough. Any inert substance similar to those which have been enumerated may be used for the protection of the bath against the action of the gaseous products of combustion provided it be sufficiently conductive of heat. The products of the electrolysis are drawn off continually from around the electrodes, the methods of handling these depending upon what they are. Sodium must be drawn off without contact with the air and collected under oil. Other products require collection through a condenser; but the methods of collecting need not be specifically described, as they have no necessary relation to the apparatus which we have described.

Figure 9:
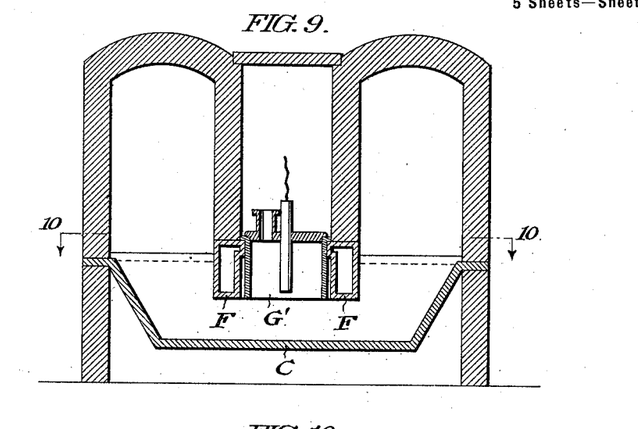
Figure 10:
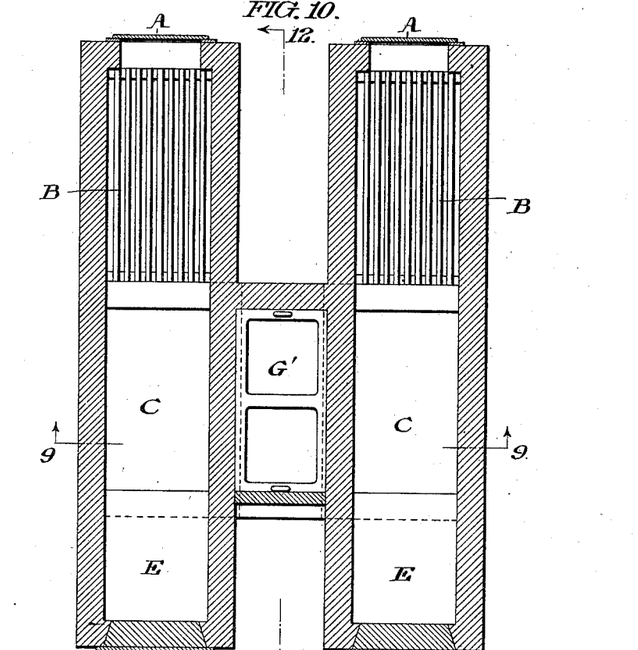
Figure 11:
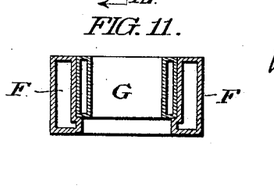
Figure 12:
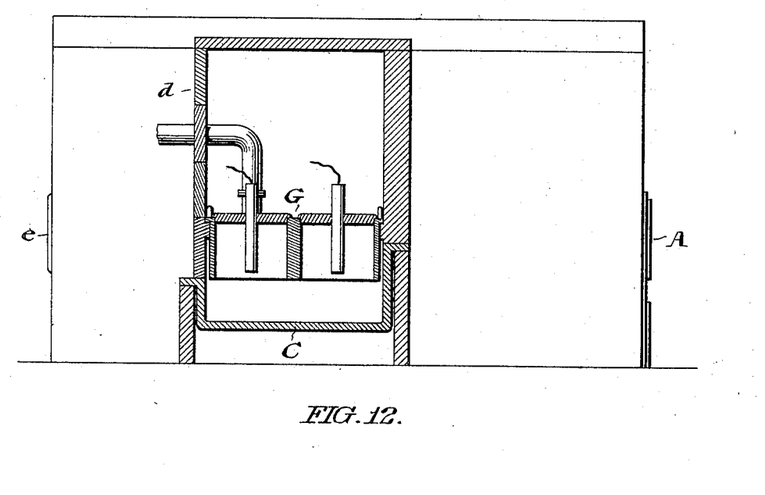

We will now proceed to describe certain modified or elaborated forms which we have devised, pointing out wherein they differ from the typical apparatus which has been described. The first of these is shown in Figs. 9, 10, 11, and 12 and is a suitable form where a high degree of heat is required to effect fusion. By this arrangement there are two heating-chambers, one on either side of the electrolytic chamber. Fig. 9 is a vertical section along 9 9, Fig. 10. Fig. 10 is a horizontal section along 10 10, Fig. 9. Fig. 11 shows in section similar to Fig. 9 an alternate method of supporting the removable electrolytic box. Fig. 12 is a vertical longitudinal section through 12 12, Fig. 10. As before, the main walls of the furnace shown in these figures may be built of fire-brick or other highly-refractory material. In general outline the structure so formed consists of two furnaces, supported a short distance from each other, having a common fusion vessel and having the electrolytic chamber between them. Each of the furnaces has its grate B, with its firing-door A. C is the fusion vessel, which, as seen in Figs. 9 and 12, runs across both furnaces adjacent to the grates and occupies also the intervening portion where is situated the electrolytic chamber. E E are preheating-compartments. Where the inner wall of the furnaces crosses the fusion vessel two partial partitions F F are placed, which dip into the fusion vessel and divide it into three parts—namely, two heating-chambers, one in each of the furnaces, and the electrolytic chamber. Into the electrolytic chamber there fits the removable electrolytic box G', corresponding closely to the electrolytic box which has already been described, and therefore no further detailed description need be given of it beyond pointing out that it contains electrode-compartments and proper connections both for establishing the electric circuit and for carrying off the products of electrolysis. As before, the removable electrolytic box is supported by a flange which rests upon a shoulder formed in the partition-walls. In Fig. 9 the position of the flange and shoulder is such that the support is at the top of the box, while in Fig. 11 an alternative form is shown, in which the support is near the bottom. In Fig. 11 the shoulder at the bottom of the partition forms a seal preventing the rise of the fused materials between the partition-walls and the box. When the box is to be removed, either the level of the fused bath may be slightly lowered by tapping the bath and drawing off part of its contents, or by checking the flow of the cooling medium through the hollow partition-walls their temperature may be allowed to rise temporarily, preventing incrustation during the interval between the removal of one box and the replacement of another. For the purpose of removing the box an arrangement similar to that shown in Fig. 4 may be employed or any other convenient apparatus. Removal may take place by running the box backward after lifting, the space between the two furnaces being open in that direction. Immediately over the electrolytic chamber this space is boxed in by removable partitions, as seen in Figs. 9 and 12. These partitions are, however, slight in their nature. Through them pass the connections by means of which the products of electrolysis are drawn off, which may be temporarily broken when the box is to be removed. Under some circumstances these walls surrounding the top of the electrolytic chamber may be entirely dispensed with. They serve merely to lessen the escape of heat at the top of the electrolytic box and are only necessary when a very high temperature is essential.

Figure 13:
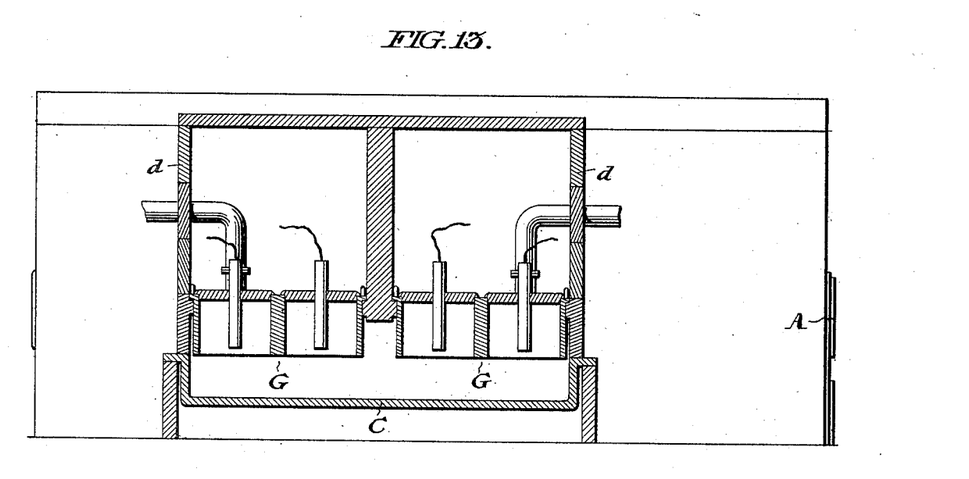
Figure 14:
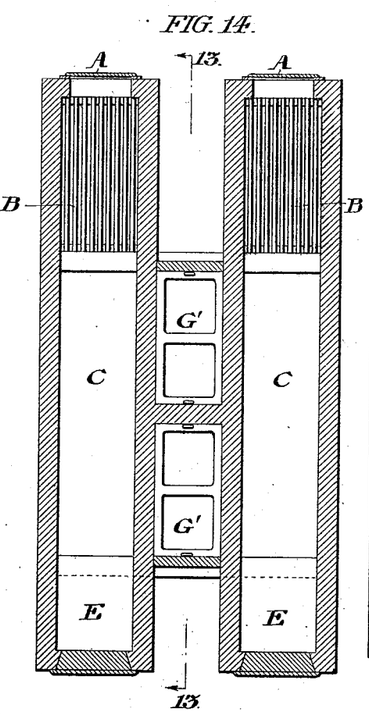

In Figs. 13 and 14 a further modification of the form which has just been described is shown. Fig. 13 is a vertical longitudinal section through 13 13 of Fig. 14. Fig. 14 is a horizontal section corresponding to Fig. 10, the only difference being that instead of one removable electrolytic box two such boxes, end on and alongside of each other, fill the electrolytic chamber. One of these is capable of being removed in one direction and the other in the other. In other respects the parts shown in this drawing correspond precisely to those shown in Fig. 10 and are similarly lettered and need no further description. The fusion vessel in this apparatus and in that last described may be formed of metal and shaped as seen in Figs. 9 and 12, the air-space being formed around it by the space intervening between it and the walls of the furnace. It has at each side sloping walls.

Figure 15:
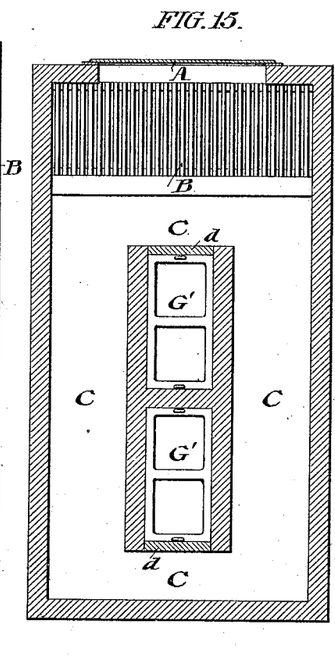

Fig. 15 is a construction in which the fused contents of the fusion vessel pass not only on either side of the electrolytic box, but all around it, thereby facilitating a higher temperature therein. The drawing is a horizontal section corresponding to Figs. 14 and 10. It differs from the construction shown in Fig. 14 in that instead of there being two furnaces there is but one, or rather the two have been united into one, the electrolytic chamber being in this way surrounded on all sides, but not at the bottom, by the fusion vessel. With this arrangement the removal of the electrolytic boxes is accomplished by raising up above the top of the end of the furnace (which is lower than the sides) and then sliding them forward or backward by an arrangement such as has been described. Although the grate is here shown as running from side to side, a divided grate, as in Fig. 10, is often preferable to this form in order to leave room for more ready access to and connection with the electrolytic boxes.

Figure 16:
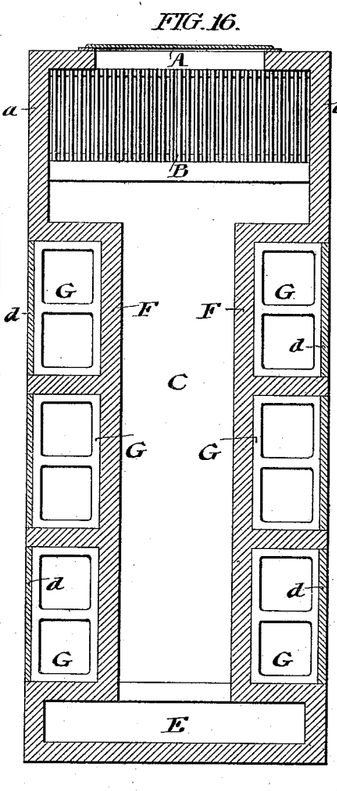
Figure 17:
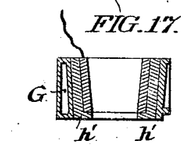
Fig. 17 is a section of an electrode-compartment, showing an electrode in the form of a hollow square inserted within it.

Fig. 16 is a diagrammatic sectional view showing a modification of our invention in which a number of removable electrolytic boxes are grouped around a single heating-compartment. The details of the construction are not shown, as they will be readily understood to correspond with what has been explained before. The central fusion vessel is heated in the usual way, and along its sides are partition-walls F, dipping below the level of the contents of the fused bath. On the outside of these partition-walls are the electrolytic chambers, alongside of each other and some distance apart, six being shown in the drawings. In each of these electrolytic chambers is a removable electrolytic box, similar in construction to those already shown and described.

It will of course be understood that the plan shown in Fig. 16 is merely typical and illustrative. There are very many ways in which a series of electrolytic compartments such as we have described may be conveniently grouped around or within a centrally-disposed fused bath. Such arrangements will readily suggest themselves to one skilled in the art and need not be here enumerated.

So far our apparatus has been described mainly with reference to heating in the usual way by coal-fire, with the deflection of the heat and air and products of combustion downward along the entire surface of the fused bath. Other modes may be employed either by themselves or in conjunction with a grate-fire. Under many circumstances oil or gas are admirably adapted for this purpose. Thus in Fig. 16 the heat produced by the grate-fire may be supplemented by the introduction of gas or oil burners at the sides, passing, for instance, between the electrolytic compartments, and by means of these burners gas or oil may be burned and the heat of the entire heating-compartment increased.

In describing the apparatus thus far it has been assumed that the products of the electrolysis, whether gaseous or liquid, were lighter in specific gravity than the fused bath and would therefore float on top of it in the region of the electrodes, where they are liberated. Corresponding means for removing these products have been shown. Under certain circumstances, however, one or more of the products of the electrolysis may be a heavier fluid or a precipitate. In such cases the removal of this product from the bottom of the fused bath may be effected by a tap-hole properly situated.

Having thus described our invention, we claim—

1. In an apparatus for the electrolysis of fused substances, the combination of a vessel for containing fusible substances; a heating-chamber of smaller dimensions than said vessel, but of which a portion of said vessel forms the bottom, and means in said heating-chamber for reducing the contents of said vessel to fusion; a partition forming one of the said walls of the heating-chamber which extends below the normal level of the fused contents of said vessel but does not reach to its bottom; an electrolytic chamber outside but immediately alongside of the heating-chamber separated from it only by said partial partition, there being no uncontrolled air-space between the two; and means consisting of positive and negative electrodes situated within said electrolytic chamber, and wholly exterior to the heating-chamber, for carrying on the electrolysis of the fused contents of the vessel.

2. In an apparatus for the electrolysis of fused substances, the combination of a heating-chamber in the form of a reverberatory furnace; a vessel for containing fused substances over which the products of combustion in the reverberatory furnace play, said fusion vessel extending at one side of the heating-chamber beyond its walls; a partition forming the last-mentioned side of the heating-chamber which extends below the normal level of the contents of said fusion vessel but which does not reach to its bottom; and means for conducting electrolysis of the contents of said fusion vessel situated wholly outside of said partial partition, substantially as described.

3. In an apparatus for the electrolysis of fused substances, the combination of a heating-chamber in the form of a reverberatory furnace; a vessel for containing fused substances over which the products of combustion in the reverberatory furnace play, said fusion vessel extending at one side of the heating-chamber beyond its walls; a partition forming the last-mentioned side of the heating-chamber which extends below the normal level of the contents of said fusion vessel but which does not reach to its bottom; a separate electrolytic box open at the bottom and carrying positive and negative electrodes and fitting removably into that part of the fusion vessel which is situated outside of the heating-chamber, substantially as described.

4. In an apparatus for the electrolysis of fused substances, the combination of a fusion vessel; means whereby products of combustion are caused to play over the surface of all but a restricted portion of the contents of said fusion vessel; one or more vertical partitions extending below the normal level of the contents of said fusion vessel wholly isolating the said restricted portion of the contents of said fusion vessel from the products of combustion whereby free access to said restricted portion may be had; a removable electrolytic box, open at the bottom, carrying positive and negative electrodes; and means for bringing said electrolytic box into or out of contact with the contents of the fusion vessel within said restricted portion, substantially as described.

5. In an apparatus for the electrolysis of fused substances, the combination of a fusion vessel and means for heating the contents thereof; a separate electrolytic box, open at the bottom, and carrying attached to itself both positive and negative electrodes; and means for placing said electrolytic box within a portion of said fusion vessel with its bottom dipping beneath the contents thereof and removing it therefrom, substantially as described.

6. In an apparatus for the electrolysis of fused substances, the combination of a fusion vessel; means for heating its contents; a separate electrolytic box open at the bottom removable therefrom carrying positive and negative electrodes and having hollow walls with means for maintaining circulation of a suitable fluid medium through said walls, substantially as described.

7. In an apparatus for the electrolysis of fused substances, the combination of a fusion vessel; vertical partitions extending below the normal level of the contents of the fusion vessel and dividing it into a centrally-located heating-chamber and a series of electrolytic chambers grouped around said heating-chamber; means situated within said heating-chamber for heating the contents of the fusion vessel; and a series of electrodes situated wholly within said electrolytic chamber whereby electrolysis may be carried on therein, substantially as described.

8. In an apparatus for the electrolysis of fused substances, the combination of a fusion vessel; means for heating the contents of said vessel; a preheating-chamber within the effective reach of the source of heat provided with a bottom above the normal level of the contents of the fusion vessel into which the contents of the preheating-chamber when fused will flow down; and electrodes immersed in the contents of the fusion vessel, substantially as described.

9. In an apparatus for the electrolysis of fused substances, the combination of a fusion vessel; means for heating its contents; a removable open-bottomed electrolytic box carrying electrodes, fitting into the fusion vessel; and ledges on the side of the fusion vessel below the normal level of its contents upon which the electrolytic box rests and which are arranged to seal the outside of the box from the contents of the fusion vessel, substantially as described.

10. In an apparatus for the electrolysis of fused substances, the combination of the fusion vessel; means for heating its contents; an open-bottomed removable electrolytic box carrying electrodes; and blocks of fire-clay, or similar resistant material, fitted removably around the inside of the electrolytic box and forming the lining thereof, substantially as described.

11. In an apparatus for the electrolysis of fused substances, the combination of a fusion vessel; two vertical partitions extending below the normal level of the contents of the fusion vessel, but not reaching to its bottom, forming three separate chambers above the fusion vessel, one at each end and one in the center; means situated within each of the end chambers for heating the contents of the fusion vessel; and one or more open-bottomed electrolytic boxes carrying electrodes fitted removably within the central chamber, substantially as described.

August 22, 1898.

CHARLES W. ROEPPER.
GEORGE P. SCHOLL.

Witnesses:
  JAMES H. BELL,
  RANDOLPH SAILER.